United States Patent
Okamoto

(10) Patent No.: US 7,455,921 B2
(45) Date of Patent: Nov. 25, 2008

(54) FUEL CELL SYSTEM HAVING REFORMER TEMPERATURE MAINTENANCE SYSTEM AND CONTROL METHOD THEREOF

(75) Inventor: Masaru Okamoto, Yokosuka (JP)

(73) Assignee: Nissan Motor Co., Ltd., Kanagawa (JP)

( * ) Notice: Subject to any disclaimer, the term of this patent is extended or adjusted under 35 U.S.C. 154(b) by 525 days.

(21) Appl. No.: 10/507,614

(22) PCT Filed: Jan. 28, 2003

(86) PCT No.: PCT/JP03/00761

§ 371 (c)(1),
(2), (4) Date: Sep. 14, 2004

(87) PCT Pub. No.: WO03/079473

PCT Pub. Date: Sep. 25, 2003

(65) Prior Publication Data

US 2005/0123812 A1     Jun. 9, 2005

(30) Foreign Application Priority Data

Mar. 15, 2002  (JP) ............................... 2002-072059

(51) Int. Cl.
*H01M 8/04* (2006.01)
(52) U.S. Cl. ............................. 429/17; 429/13; 429/19; 429/20; 429/22; 429/24
(58) Field of Classification Search .................. None
See application file for complete search history.

(56) References Cited

U.S. PATENT DOCUMENTS

| 5,009,967 | A | 4/1991 | Scheffler |
| 5,976,724 | A | 11/1999 | Bloomfield |
| 6,348,278 | B1 * | 2/2002 | LaPierre et al. ................ 429/17 |
| 6,893,755 | B2 * | 5/2005 | Leboe .......................... 429/17 |
| 2002/0159932 | A1 * | 10/2002 | Brooks et al. ................ 422/198 |
| 2004/0028965 | A1 * | 2/2004 | McElroy et al. ............... 429/21 |

FOREIGN PATENT DOCUMENTS

| DE | 100 33 036 A1 | 1/2001 |
| EP | 0 374 368 A1 | 8/1989 |
| JP | 62272468 | 11/1987 |
| JP | 08-045521 | 2/1996 |
| JP | 11-307110 | 11/1999 |
| JP | 11-354145 | * 12/1999 |
| JP | 2001-210338 A | 8/2001 |
| JP | 2001-338670 A | 12/2001 |
| WO | WO 01/92050 A1 | 12/2001 |

* cited by examiner

*Primary Examiner*—Jonathan Crepeau
*Assistant Examiner*—Tony Chuo
(74) *Attorney, Agent, or Firm*—McDermott Will & Emery LLP

(57) ABSTRACT

A fuel cell system comprises a reformer (8) which produces reformate gas containing hydrogen using gas containing oxygen and raw material vapor, and a fuel cell (9) which generates power by reacting hydrogen in the reformate gas with oxygen. A controller (21) determines whether or not excess hydrogen has been produced by the reformer (8), and when it is determined that excess hydrogen was produced, burns the excess hydrogen to keep the reformer (8) warm.

20 Claims, 10 Drawing Sheets

FUEL CELL SYSTEM HAVING REFORMER TEMPERATURE MAINTENANCE SYSTEM AND CONTROL METHOD THEREOF

FIELD OF THE INVENTION

This invention relates to a fuel cell system, and more particularly to control when load is decreased.

BACKGROUND OF THE INVENTION

JP8-45521A published by the Japanese Patent Office in 1996 and JP11-307110A published by the Japanese Patent Office in 1999 disclose a fuel cell system wherein raw fuel having hydrocarbons as its main component is vaporized, and the raw material vapor and air are supplied to a reformer. In the reformer, hydrocarbons in the raw material and oxygen in the air react together to produce hydrogen-rich reformate gas. The hydrogen-rich reformate gas and air are supplied to the fuel cell, and in the fuel cell, the hydrogen in the reformate gas and oxygen in the air undergo an electrochemical reaction to produce power.

SUMMARY OF THE INVENTION

When the aforesaid fuel cell is connected to a load device which consumes power produced in the fuel cell, the raw material and air flowrate supplied to the reformer must be controlled so that the fuel cell generates the power required by the load which varies according to running conditions.

However, when the load decreases, even if the vaporizer is controlled so that the flowrate of raw material and air suits the flowrate which corresponds to the decreased load, the raw material and oxygen supplied slightly prior to the load decrease will remain in the reformer, so the reformer will continue to produce hydrogen-rich reformate gas for some time, and excess hydrogen is therefore generated. As this excess hydrogen is unnecessary, in the aforesaid prior art apparatus, the raw material supplied to the reformer is decreased to suppress the generation of excess hydrogen. However, the flow of raw material must be continued, so fuel consumption increases.

The reason why the supply of raw material is continued despite the decrease in load, is as follows. If the supply of raw material to the reformer is decreased, as excess hydrogen is unnecessary, the catalyst temperature of the reformer is correspondingly reduced to below the catalyst activation temperature. When the load next increases so that hydrogen-rich reformate gas is required, some time is necessary for reforming reactions in the reformer to occur and generate hydrogen-rich reformate gas, so the reformer must be maintained at the temperature required to maintain activity.

It is therefore an object of this invention to use excess hydrogen to keep a reformer warm, and to rapidly generate hydrogen-rich reformate gas when the load increases and hydrogen-rich reformate gas is required.

In order to achieve above object, the present invention provides a fuel cell system, comprising a reformer which produces reformate gas containing hydrogen using a gas containing oxygen and raw material vapor, a fuel cell which generates power by causing hydrogen in the reformate gas to react with oxygen, a load device which consumes the power generated by the fuel cell, a reformer temperature maintenance system which keeps the reformer warm, and a controller functioning to determine whether excess hydrogen is produced by the reformer, and when it is determined that excess hydrogen is produced, burn the excess hydrogen in the reformer temperature maintenance system to keep the reformer warm.

According to an aspect of the invention, this invention provides a method of controlling a fuel cell system having a reformer which produces reformate gas containing hydrogen using gas containing oxygen and raw material vapor, and a fuel cell which generates power by reacting hydrogen in the reformate gas with oxygen, comprising determining whether excess hydrogen is produced by the reformer, and when it is determined that excess hydrogen is produced, burning the excess hydrogen to keep the reformer warm.

The details as well as other features and advantages of this invention are set forth in the remainder of the specification and are shown in the accompanying drawings.

DESCRIPTION OF THE PREFERRED EMBODIMENTS

Figure 1:
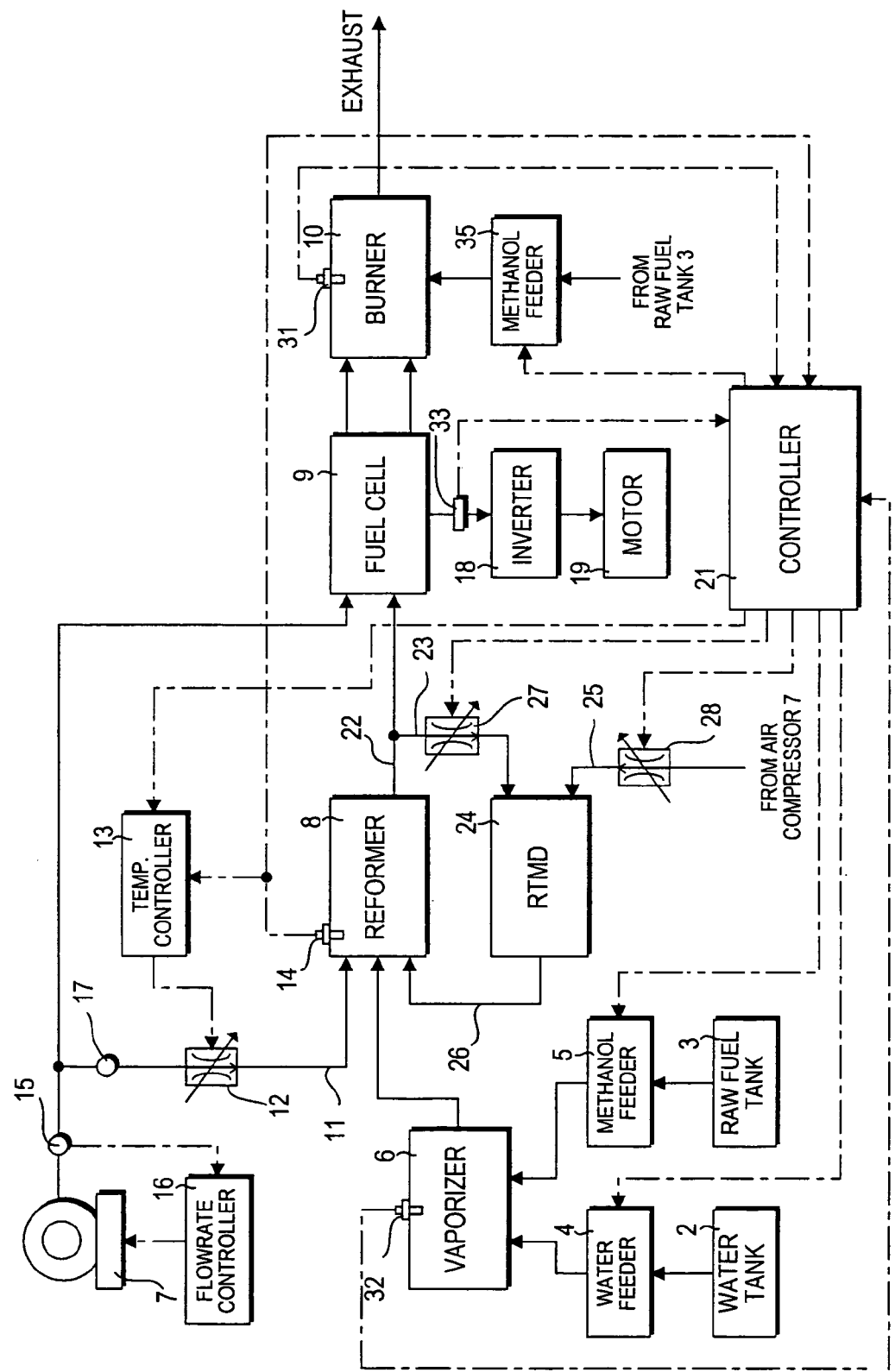
FIG. 1 is a schematic view of a fuel cell system according to this invention.

FIG. 1 of the drawings shows a fuel cell system according to a first embodiment of this invention. First, the basic construction and operation will be described.

Water in a water tank 2 and methanol in a raw fuel tank 3 are sent to a vaporizer 6 by a water feeder 4 and methanol feeder 5, and heated to become a mixture of water and methanol vapor (raw material vapor) which is supplied to a reformer 8. Here, the water feeder 4 and methanol feeder 5 mainly comprise a feed pump and an injector.

Target values of the water flowrate and methanol flowrate are computed by a controller 21 based on the required power generation amount of a fuel cell 9, and the controller 21 controls flowrate control devices (injectors) in the feeders 4, 5 so that these target values are realized. If the fuel cell system is installed in a vehicle, the required power generation amount is computed based on the driver's accelerator pedal depression amount.

Air (oxygen-containing gas) is sent to the reformer 8 by an air compressor 7. In order to supply all the air required by the whole fuel cell system, a flowrate controller 16 controls the rotation speed of the air compressor 7 so that the compressor discharge flowrate detected by a flowrate sensor 15 is equal to the sum of the air flowrate required by the reformer 8 and the air flowrate required by the fuel cell 9. In this case, the non-interference control system disclosed for example in JP2001-338659A published by the Japanese Patent Office may be used for control of the flowrate controller 16.

The reformer 8 causes a gaseous mixture of water and methanol to react with oxygen in the air and generate hydrogen-rich reformate gas. The reformer 8 operates under autothermal conditions where the heat liberated by the partial oxidation reaction balances the heat absorbed by the decomposition of the methanol. Therefore, the temperature controller 13 into which the reformer temperature from the temperature sensor 14 is input, controls the air flowrate supplied to the reformer 8 by adjusting the opening of a flowrate control valve 12 installed in an air passage 11 leading to the reformer 8 so that the reformer temperature is a target temperature.

The hydrogen-rich reformate gas contains a low level of carbon monoxide. This carbon monoxide poisons the electrode catalyst comprising platinum in the solid electrolyte fuel cell 9 so that its activity is considerably reduced, so a shift reactor which removes carbon monoxide is installed together with the reformer 8.

Reformate gas in which the carbon monoxide has been reduced to a very low level, and air from the air compressor 7, are then sent respectively to a fuel electrode and air electrode in the fuel cell 9. In the fuel cell 9, the oxygen in the air and hydrogen in the reformate gas undergo an electrochemical reaction to generate power.

In the fuel cell 9, it is difficult to use all the hydrogen in reformate gas, so reformate gas used for generating power containing some remaining hydrogen, and air used for generating power containing some remaining oxygen, are sent to a catalyst burner 10 where they are burnt. The resulting hot combustion gas obtained is sent to the vaporizer 6, and used for energy to vaporize methanol and water.

The fuel cell system is installed in a vehicle, and a current extracted from the fuel cell 9 is made to flow to a motor 19 for driving the vehicle via an inverter 18. The inverter 18 and motor 19 are load devices which consume power generated by the fuel cell 9.

When the fuel cell system is combined with load devices which vary depending on running conditions, the flowrates of raw material and air supplied to the reformer 8 must be controlled so that the power required by the load devices is generated by the fuel cell 9. However, when the power required by the load devices decreases (when the load decreases), raw material and air immediately prior to the load decrease remains in the reformer 8 even if the raw material and air flowrates are adjusted to suit the conditions after the load decrease, so the reformer 8 continues producing hydrogen-rich reformate gas, and more hydrogen than is required to provide power for the load devices when the load decreases (excess hydrogen) is produced in the reformate gas.

According to this invention, in the fuel cell system combined with the load devices which vary load according to running conditions, when excess hydrogen is produced such as when the load decreases, this excess hydrogen is burnt, and the gas produced by this combustion is recycled upstream of the reformer 8 to keep the reformer 8 warm. By burning the excess hydrogen to keep the reformer 8 warm, it is unnecessary to supply raw material and air to the reformer 8, so supply of raw material and air to the reformer 8 is stopped.

This will now be described in more detail. In FIG. 1, a passage 23 is provided which branches off from the passage 22 supplying hydrogen-rich reformate gas produced by the reformer 8 to the fuel cell 9, and part or all of the reformate gas from the reformer 8 is led to a reformer temperature maintenance device (RTMD) 24 via this branch passage 23.

Air from the air compressor 7 is also led to the reformer temperature maintenance device 24 via an air feed passage 25. The reformer temperature maintenance device 24 comprises an oxidation catalyst, and excess hydrogen in the reformate gas which has been introduced via the branch passage 23 is burnt by the oxygen in the air supplied from the air compressor 7. Hot burnt gas is recycled to the inlet of the reformer 8 via a passage 26.

Flowrate control valves 27, 28 are provided in the branch passage 23 and air feed passage 25. The opening of these control valves 27, 28 is controlled by signals from the controller 21.

In the controller 21, it is determined whether or not excess hydrogen is produced, based on a difference between a hydrogen flowrate Qh2gen in the reformate gas produced in the reformer 8, and a hydrogen flowrate Qh2sum required by the fuel cell 9 to provide the power consumed by the load devices. When it is determined that excess hydrogen was produced, the flowrate control valves 27, 28 are both opened.

In the controller 21, the two flowrate control valves 27, 28 are controlled as follows during temperature maintenance of the reformer 8 by burning excess hydrogen.

[1] The excess hydrogen used when the load decreases is transported to the burner 10, and burnt. If the burner 10 rises above the permitted upper limiting temperature, the lifetime of the burner 10 will be shortened. However, if the excess hydrogen is removed, burnt in the reformer temperature maintenance device 24 and recycled to the reformer 8 as in this invention, the temperature rise of the burner 10 can be suppressed.

Likewise, if the reformer 8 rises above the permitted upper limiting temperature due to recycling of burnt gas, although this is intended to maintain the temperature, the lifetime of the reformer 8 will be shortened. Therefore although it is necessary the process the excess hydrogen, the burnt gas must be recycled in such a way that the reformer 8 and burner 10 do not rise above the upper limiting temperatures.

Therefore, a temperature sensor 31 is additionally provided which detects the temperature of the burner 10. A target flowrate Qrec of the recycled reformate gas is then computed based on the temperatures of the reformer 8 and burner 10 detected by the temperature sensors 31, 14, and the reformate gas flowrate ΔQgas (hereinafter, this reformate gas will be referred to as "recycled reformate gas"). The opening of the flowrate control valve 27 is then controlled so that the flowrate of recycled reformate gas is the target flowrate Qrec.

[2] Air is introduced into the reformer temperature maintenance device 24 to burn the excess hydrogen in the recycled reformate gas, so the temperature of the reformer 8 is adjusted by increasing or increasing the air flowrate. Here, when the excess hydrogen in the recycled reformate gas is burnt to keep the reformer 8 warm, the opening of the flowrate control valve 28 is feedback controlled based on the actual reformer temperature so that the reformer catalyst is kept active.

The controller 21 also performs recovery control to the state prior to when the excess hydrogen was produced, as follows.

[3] When the reformer 8 is kept warm using excess hydrogen, the supply of raw material vapor and air to the reformer 8 is stopped, and as the production of excess hydrogen is temporary, once the excess hydrogen in the recycled reformate gas has all been burnt, not only the temperature of the reformer 8 but also that of the burner 10 or vaporizer 6, will fall. If the reformer temperature falls to a temperature at which the catalyst becomes inactive, and the temperatures of the burner 10 and vaporizer 6 fall to a temperature at which the performance required of these devices cannot be obtained, when the load subsequently increases and production of hydrogen is required, the reforming reaction in the reformer 8 cannot be started quickly, and the response performance of hydrogen production will be poor.

Hence, a temperature sensor 32 is provided to detect the temperature of the vaporizer 6. After warming of the reformer 8 has started using excess hydrogen, if the temperature of any of the reformer 8, burner 10 and vaporizer 6 detected by the temperature sensors 14, 31, 32 should fall below the respective predetermined values, warming of the reformer 8 by the reformer temperature maintenance device 24 is stopped, and supply of raw material vapor and air to the reformer 8 is recommenced (supply of raw fuel and water to the vaporizer 6 is recommenced, and the flowrate control valve 12 is opened by the temperature controller 13 to recommence air supply).

[4] When the excess hydrogen contained in the recycled reformate gas is burnt and the reformer 8 is kept warm, the temperatures of the reformer 8, burner 10 and vaporizer 6 may occasionally fall below their respective predetermined values, so the following additional construction and operation is provided. Specifically, to return the system more rapidly to the state prior to generation of excess hydrogen at this time, a second methanol feeder 35 is provided separately from the aforesaid methanol feeder 5, and when all of the three temperatures have fallen below their respective predetermined values, in addition to the procedure of [3], methanol is supplied to the burner 10 by the second methanol feeder 35 so as to raise the temperature of the burner 10.

Next, the above control performed by the controller 21 will be described in detail based on the following flowchart.

The controller 21 controls the two flowrate control valves 27, 28, water feeder 4, methanol feeder 5, flowrate control valve 12 and second methanol feeder 35. The flowrate control valve 12 is controlled via the temperature controller 13.

Figure 2:
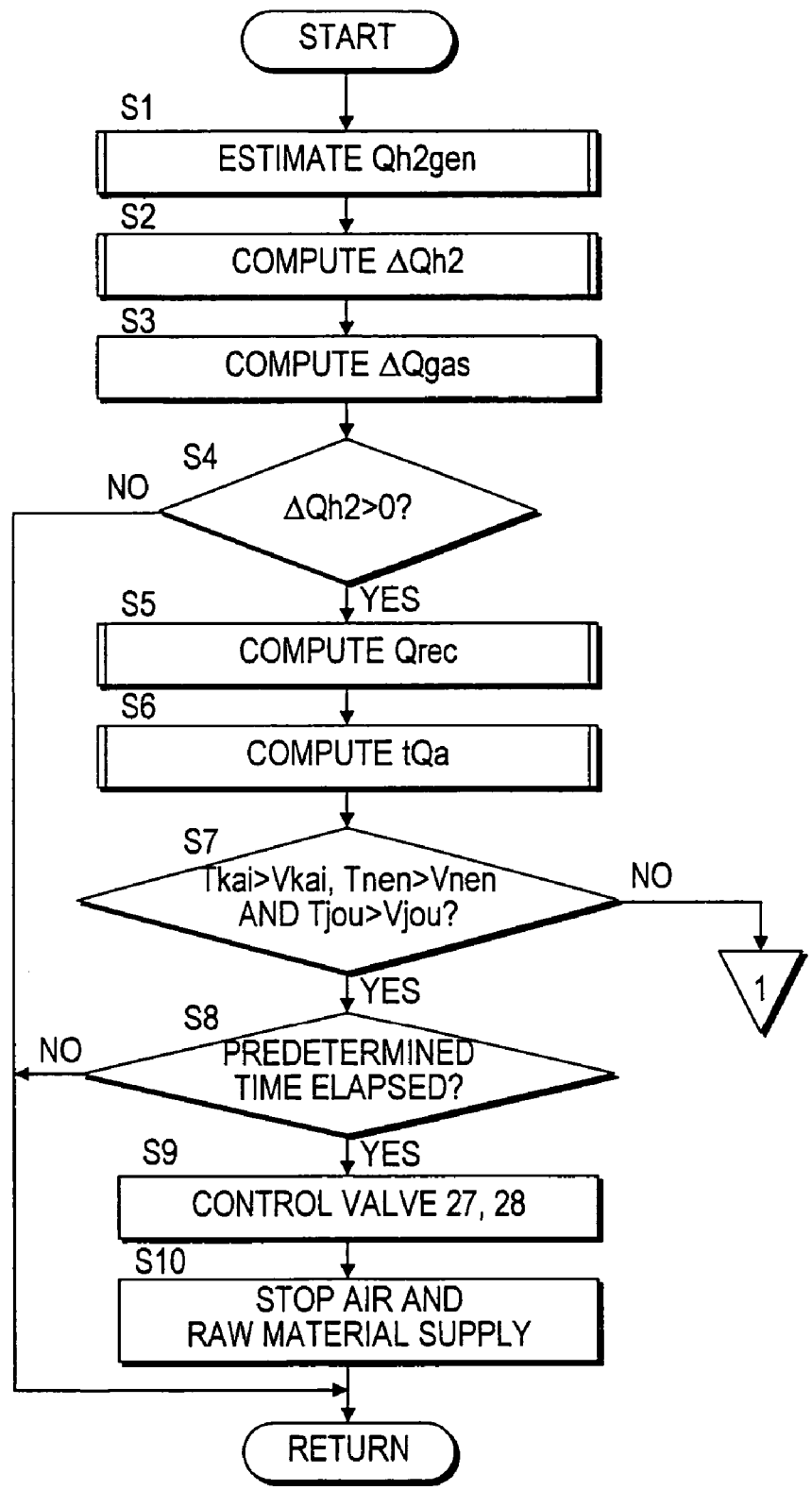
FIG. 2 is a flowchart showing the details of a control performed by a controller.
Figure 3:
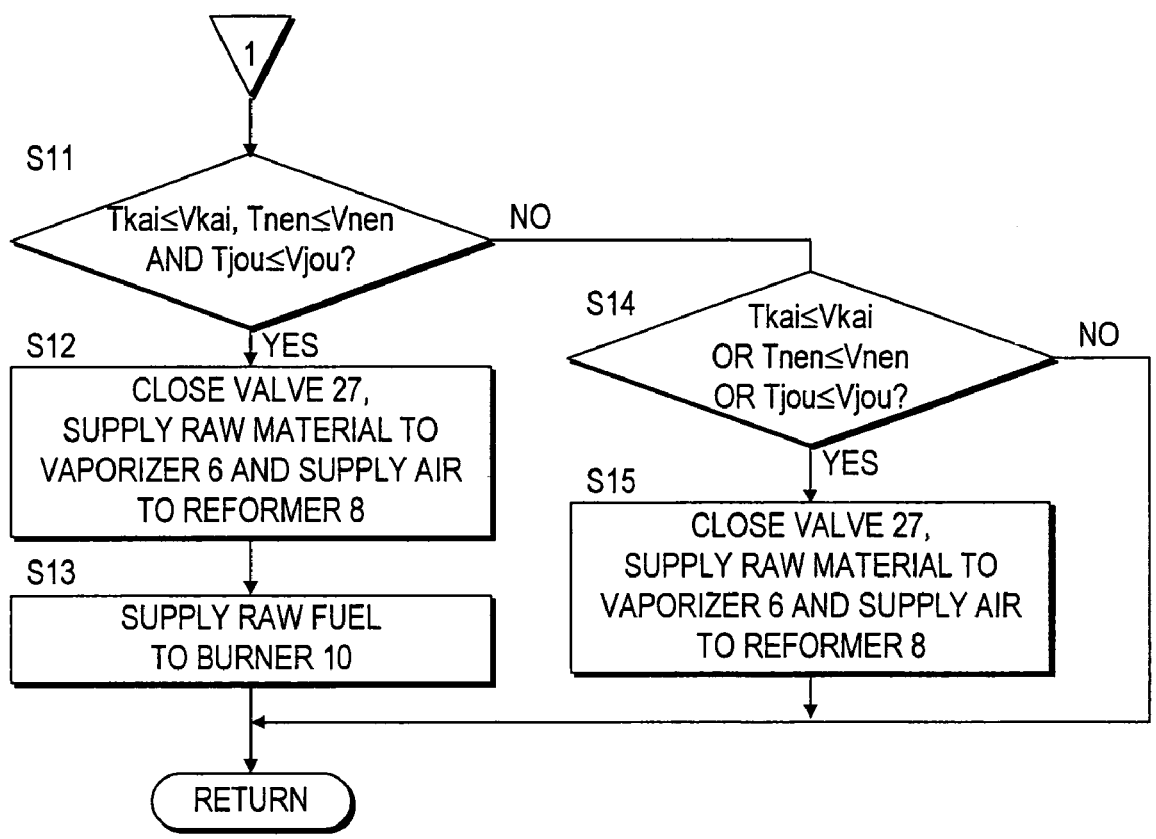
FIG. 3 is a continuation of the flowchart of FIG. 2.

FIG. 2, FIG. 3 show the control performed on these six units at a predetermined interval (e.g., ten milliseconds).

In a step S1, a hydrogen flowrate Qh2gen produced by the reforming reaction due to the reformer catalyst is estimated. The estimation of the hydrogen flowrate Qh2gen will be described using FIG. 4.

Figure 4:
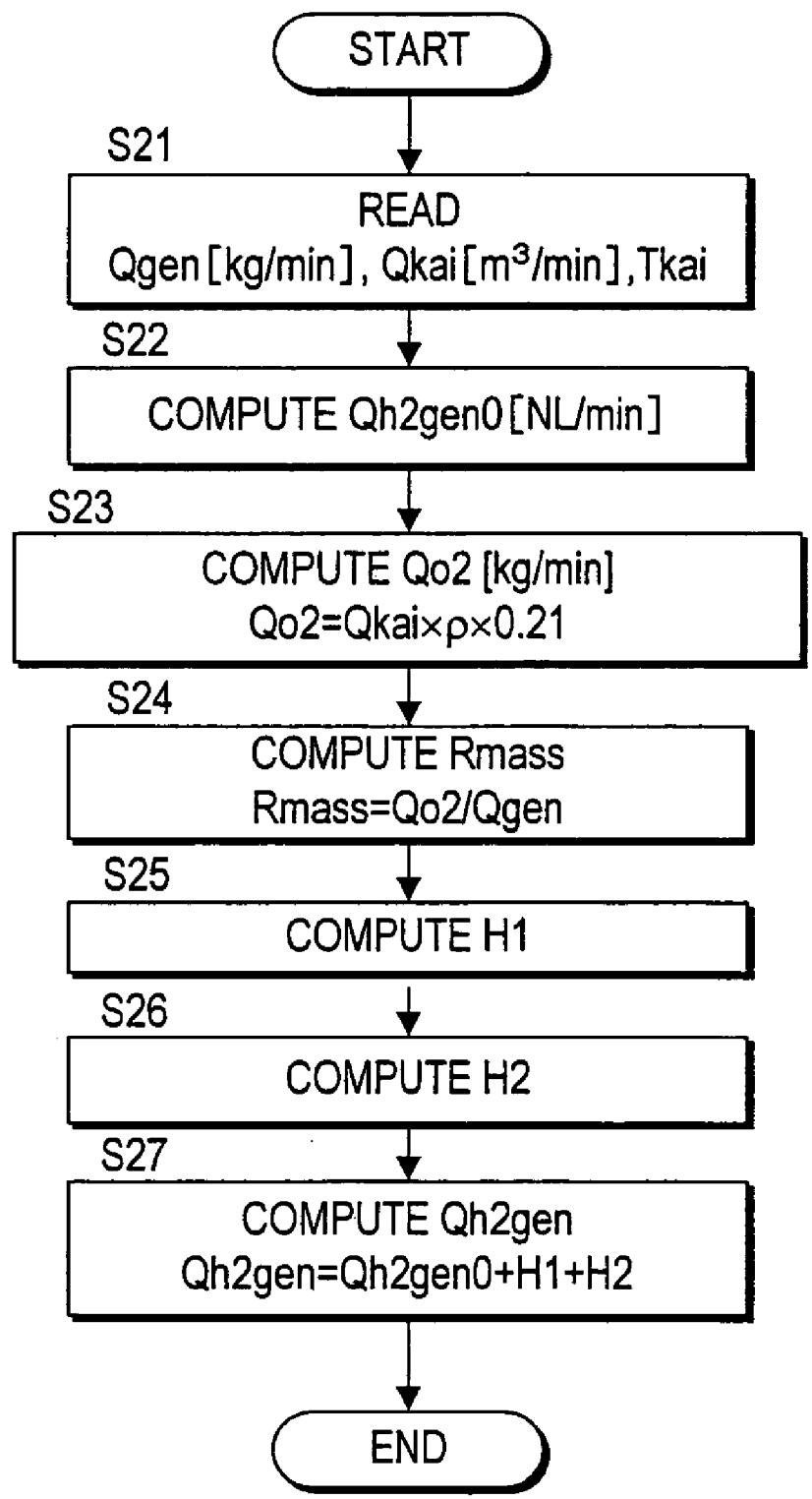
FIG. 4 is a flowchart showing a hydrogen flowrate estimation processing.

In FIG. 4, in a step S21, a raw material flowrate Qgen [kg/min], and air flowrate Qkai [m$^3$/min] to the reformer 8 detected by the flowrate sensor 17 and reformer temperature Tkai detected by the temperature sensor 14, are read.

Figure 5:
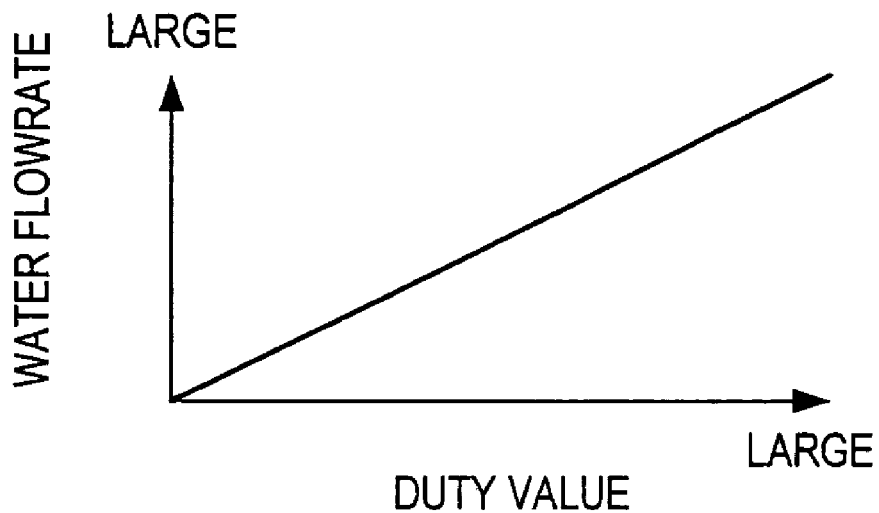
FIG. 5 is a characteristic diagram of a water flowrate.
Figure 6:
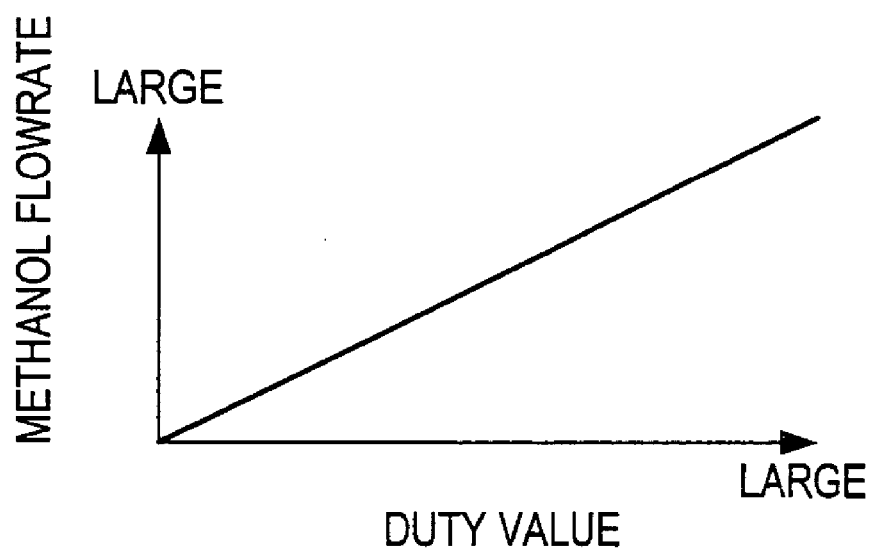
FIG. 6 is a characteristic diagram of a methanol flowrate.

The above raw material flowrate Qgen is a value obtained by adding the water flowrate and methanol flowrate. As the water flowrate and methanol flowrate are controlled by a duty value supplied to the injector (the flowrate increases the more the duty value increases), the water flowrate [kg/min] and methanol flowrate [kg/min] can be calculated from these duty values by looking up tables shown in FIG. 5, FIG. 6, and if the two are added together, the raw material flowrate Qgen can be calculated.

Figure 7:
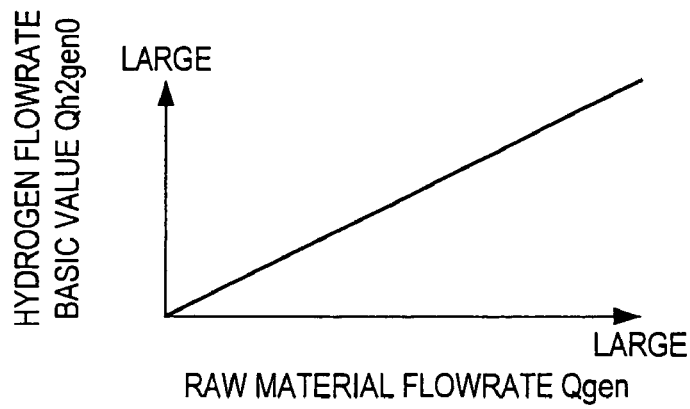
FIG. 7 is a characteristic diagram of a hydrogen flowrate basic value.

In a step S22, a hydrogen flowrate basic value Qh2gen0 [NL/min] is computed from the raw material flowrate Qgen by looking up a table shown in FIG. 7. The hydrogen flowrate basic value Qh2gen0 is the hydrogen flowrate for the standard mass ratio and standard reformer temperature, and is directly proportional to the raw material flowrate Qgen as shown in FIG. 7. "N" which is appended to "L" (liters) in the unit of the hydrogen flowrate basic value expresses that this is a value of the standard state (0° C., 1 atm).

The standard mass ratio and standard reformer temperature are the mass ratio and temperature at which it is desired to run the reformer 8, the standard mass ratio being determined by the reaction equation in the reformer catalyst. The standard reformer temperature is determined by the specifications of the reformer catalyst, and may for example be 400° C.

In a step S23, the oxygen flowrate (mass flowrate) Qo2 [kg/min] in the air flowrate Qkai is calculated by the following equation (1):

$$Qo2 = Qkai \times \rho \times 0.21 \qquad (1)$$

where, $\rho$=air density [kg/m$^3$]. 0.21 in equation (1) is the proportion of oxygen flowrate in the air flowrate.

In a step S24, a mass ratio Rmass is calculated from the oxygen flowrate Qo2 and raw material flowrate Qgen by the following equation (2):

$$Rmass = Qo2/Qgen \qquad (2)$$

Figure 8:
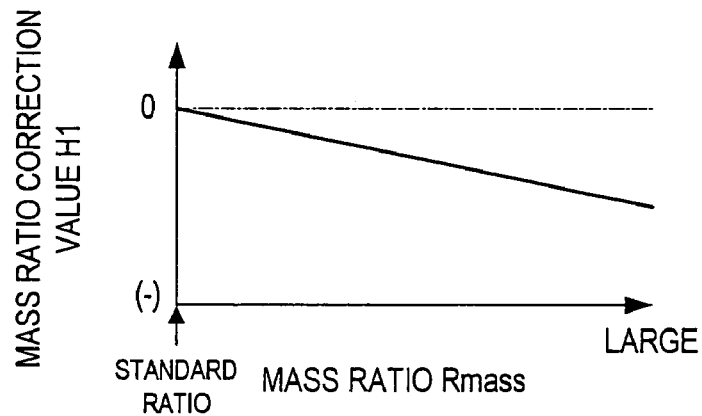
FIG. 8 is a characteristic diagram of a mass ratio correction value.

A mass ratio correction value H1 is then computed in a step S25 by looking up a table shown in FIG. 8 based on the mass ratio Rmass.

Figure 9:
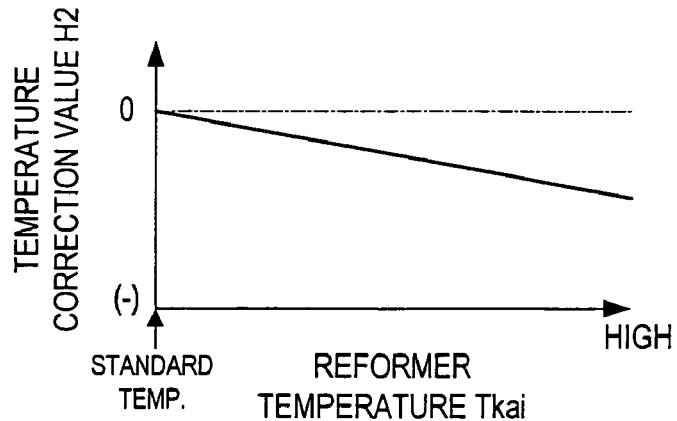
FIG. 9 is a characteristic diagram of a temperature correction value.

Likewise, a temperature correction value H2 is computed in a step S26 by looking a table shown in FIG. 9 from the reformer temperature. In a step S27, using these two correction values H1, H2 and the basic value Qh2gen0, the hydrogen flowrate Qh2gen [NL/min] generated by the reformer 8 is computed by the following equation (3):

$$Qh2gen = Qh2gen0 + H1 + H2 \qquad (3)$$

The mass ratio correction value H1 is a correction value (negative value) when the actual mass ratio deviates from the standard mass ratio to the lean side, and is such that the hydrogen flowrate decreases the more the mass ratio exceeds the standard mass ratio, as shown in FIG. 8. This is because, when the mass ratio increases (oxygen increases), the carbon monoxide and carbon dioxide components increase, and the hydrogen component decreases. Also, the temperature correction value H2 is a correction value (negative value) when the actual reformer temperature deviates from the standard reformer temperature to the high side, and is such that the hydrogen flowrate decreases the more the reformer temperature exceeds the standard reformer temperature, as shown in FIG. 9. This is because, when the reformer temperature increases, the carbon monoxide component increases and the hydrogen component decreases correspondingly.

The actual characteristics of FIG. 8, FIG. 9, FIG. 7 are determined by simulation or experiment.

When the estimation of the hydrogen flowrate Qh2gen produced by the reformer 8 is complete, the routine returns to FIG. 2, and in a step S2, the excess hydrogen flowrate $\Delta$Qh2 is computed. The computation of the excess hydrogen flowrate $\Delta$Qh2 will now described referring to flowchart of FIG. 10.

Figure 10:
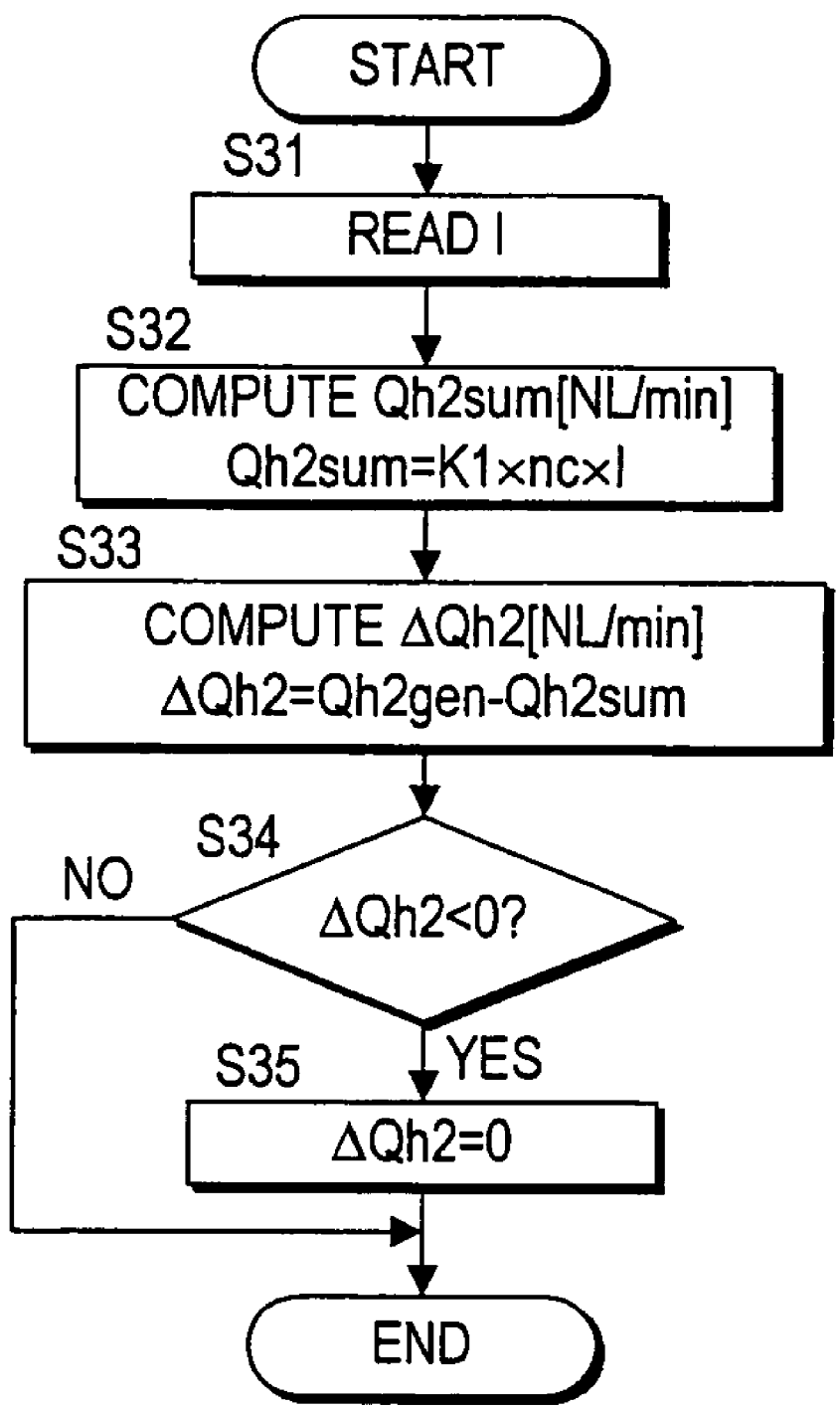
FIG. 10 is a flowchart showing the computation of an excess hydrogen flowrate.

In FIG. 10, in a step S31, a current/[A] detected by a current sensor 33, is read. The current/is the current which can be extracted from the fuel cell 9. In a step S32, a hydrogen flowrate (hereafter, this hydrogen flowrate is referred to as "consumed hydrogen flowrate") Qh2sum required by the fuel cell 9 to provide the power required for the load devices, is computed. Specifically, the consumed hydrogen flowrate Qh2sum [NL/min] is computed from the current/by the following equation (4):

$$Qh2sum = K1 \times nc \times I \qquad (4)$$

nc is the total number of cells forming the fuel cell 9, for example 420. The coefficient K1 is a value which depends on the characteristics of the fuel cell 9, for example 7.0.

In a step S33, the difference between the hydrogen flowrate Qh2gen produced by the reformer 8 and the consumed hydrogen flowrate Qh2sum, is computed as the excess hydrogen flowrate ΔQh2. In other words, the excess hydrogen flowrate ΔQh2 is computed by the following equation (5):

$$\Delta Qh2 = Qh2\text{gen} - Qh2\text{sum} \tag{5}$$

In a step S34, the excess hydrogen flowrate ΔQh2 is compared with zero, and when ΔQh2 is negative, the routine proceeds to a step S35 and ΔQh2 is limited to zero. This is because the calculation result of equation (5) can be negative due to calculation error, and this limitation takes account of that possibility.

When the computation of the excess hydrogen flowrate ΔQh2 is complete, the routine returns to FIG. 2, and in a step S3, the reformate gas flowrate ΔQgas [NL/min] produced by the reformer 8 is calculated by the following equation (6):

$$\Delta Qgas = \Delta Qh2 \times K2 \tag{6}$$

where K2=coefficient.

The reformate gas flowrate ΔQgas must always be larger than the excess hydrogen flowrate ΔQh2, so the coefficient K2 is a value larger than 1.0 (constant value).

In a step S4, the excess hydrogen flowrate ΔQh2 is compared with a predetermined value (e.g., zero), and it is determined whether or not excess hydrogen is present. If ΔQh2 is less than the predetermined value (less than zero), excess hydrogen is not produced, and as it is not necessary to burn excess hydrogen, the routine is terminated.

On the other hand, if ΔQh2 is larger than the predetermined value (positive value), it is determined that excess hydrogen is being produced, so the routine proceeds to a step S5 and the target recycled reformate gas flowrate Qrec is computed. The computation of the target recycled reformate gas flowrate Qrec will be described referring to the flowchart of FIG. 11.

Figure 11:
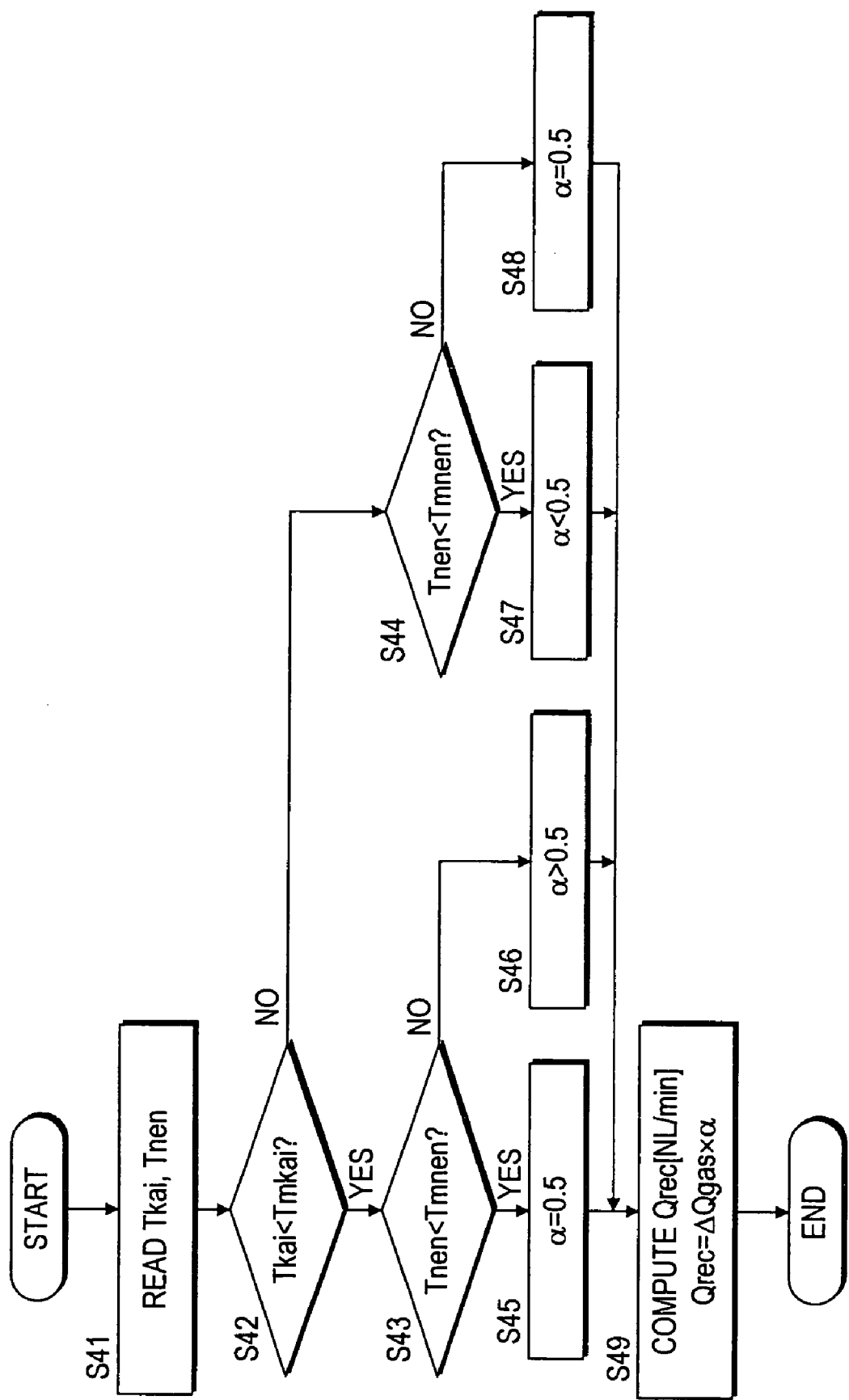
FIG. 11 is a flowchart showing the computation of a target recycled reformate gas flowrate.

In FIG. 11, in a step S41, a reformer temperature Tkai detected by the temperature sensor 14 and a burner temperature Tnen detected by the temperature sensor 31, are read. In steps S42, S43, S44, the reformer temperature Tkai and the permitted upper limiting temperature Tmkai of the reformer 8 are compared, and the burner temperature Tnen and a permitted upper limiting temperature Tmnen of the burner 10 are compared.

This comparison is made in order to determine whether the temperature rise of the reformer 8 or burner 10 is within the permitted range, and excess hydrogen can be burnt. Describing this in more detail, excess hydrogen must be burnt, but in the fuel reforming system, only the reformer 8 and burner 10 are able to burn the excess hydrogen. In this case, the reformer 8 and burner 10 are controlled to a target temperature, but when the excess hydrogen is burnt due to catalytic reactions, the temperature rises. If this temperature rise is within the permitted range, there is no problem. Therefore, excess hydrogen is burnt so that the temperature rise does lie within the permitted range. The target temperature tTkai of the reformer 8 is for example 400° C., and the target temperature tTnen of the burnt 10 is for example 370° C., so if the permitted temperature value for the reformer 8 is determined to be ε1 (e.g., about 20° C.) and the permitted temperature value for the burner 10 is determined to be ε2 (e.g., about 20° C.), the permitted upper limiting temperature of the reformer 8 is 420° C. (Tmkai=tTkai+ε1 =400° C.+20° C.=420° C.), and the permitted upper limiting temperature Tmnen of the burner 10 is 390° C. (tTnen+ε2=370° C.+20° C.=390° C.).

By comparing the permitted upper limiting temperatures Tmkai, Tmnen with the actual temperatures Tkai, Tnen, it can be determined whether or not the temperature rise required to burn the excess hydrogen can be permitted.

Specifically, the following four cases may be distinguished, and the optimum distribution ratios set for the reformer 8 and burner 10 for each case. If the distribution ratio of excess hydrogen (therefore, of reformate gas containing excess hydrogen) to the reformer 8 is α, the distribution ratio to the burner 10 is 1−α. α is an integer from 0 to 1.

(a) If the reformer 8 is lower the permitted upper limiting temperature Tmkai, and the burner 10 is lower than the upper limiting temperature Tmnen, the routine proceeds to a step S45, and the distribution ratio α to the reformer 8 is set to 0.5 so as to distribute reformate gas containing excess hydrogen equally to the reformer 8 and burner 10.

(b) If the reformer 8 is lower the permitted upper limiting temperature Tmkai, and the burner 10 is above the upper limiting temperature Tmnen, the routine proceeds to a step S46, and as a large amount must be distributed to the reformer 8, α is set larger than 0.5, e.g. to 0.7.

(c) If the reformer 8 is above the permitted upper limiting temperature Tmkai, and the burner 10 is lower than the upper limiting temperature Tmnen, the routine proceeds to a step S47, and as a large amount must be distributed to the burner 10, α is set smaller than 0.5, e.g. to 0.3.

d) If the reformer 8 is above the permitted upper limiting temperature Tmkai, and the burner 10 is above the upper limiting temperature Tmnen, the routine proceeds to a step S48, and α is set to 0.5 to distribute equally to both of these devices.

In a step S49, the distribution amount of reformate gas containing excess hydrogen to the reformer 8 (=target recycled reformate gas flowrate Qrec) [NL/min] is computed by the following equation (7):

$$Qrec = \Delta Qgas \times \alpha \tag{7}$$

The distribution amount to the burner 10 is ΔQgas×(1−α).

By determining the distribution of reformate gas containing excess hydrogen between the reformer 8 and burner 10 according to the temperatures of the reformer 8 and burner 10, the temperatures of the reformer 8 and burner 10 are prevented from rising excessively. If one of these temperatures is lower than the permitted upper limiting temperature, excess hydrogen can be supplied in larger amount to and burnt by that device.

When the computation of the target recycled reformate gas flowrate Qrec is complete, the routine returns to FIG. 2, and the air flowrate tQa required to burn the hydrogen in this recycled reformate gas (hereafter, this air flowrate is referred to as "target air flowrate") is computed in a step S6.

The reason why air must be supplied to the reformer temperature maintenance device 24, is that the reformer temperature maintenance device 24 is filled with a combustion catalyst, and an oxidizing agent is required to burn the excess hydrogen. Oxygen in the air is therefore used as the oxidizing agent for this combustion.

The computation of the target air flowrate tQa will now be described referring to the flowchart of FIG. 12.

Figure 12:
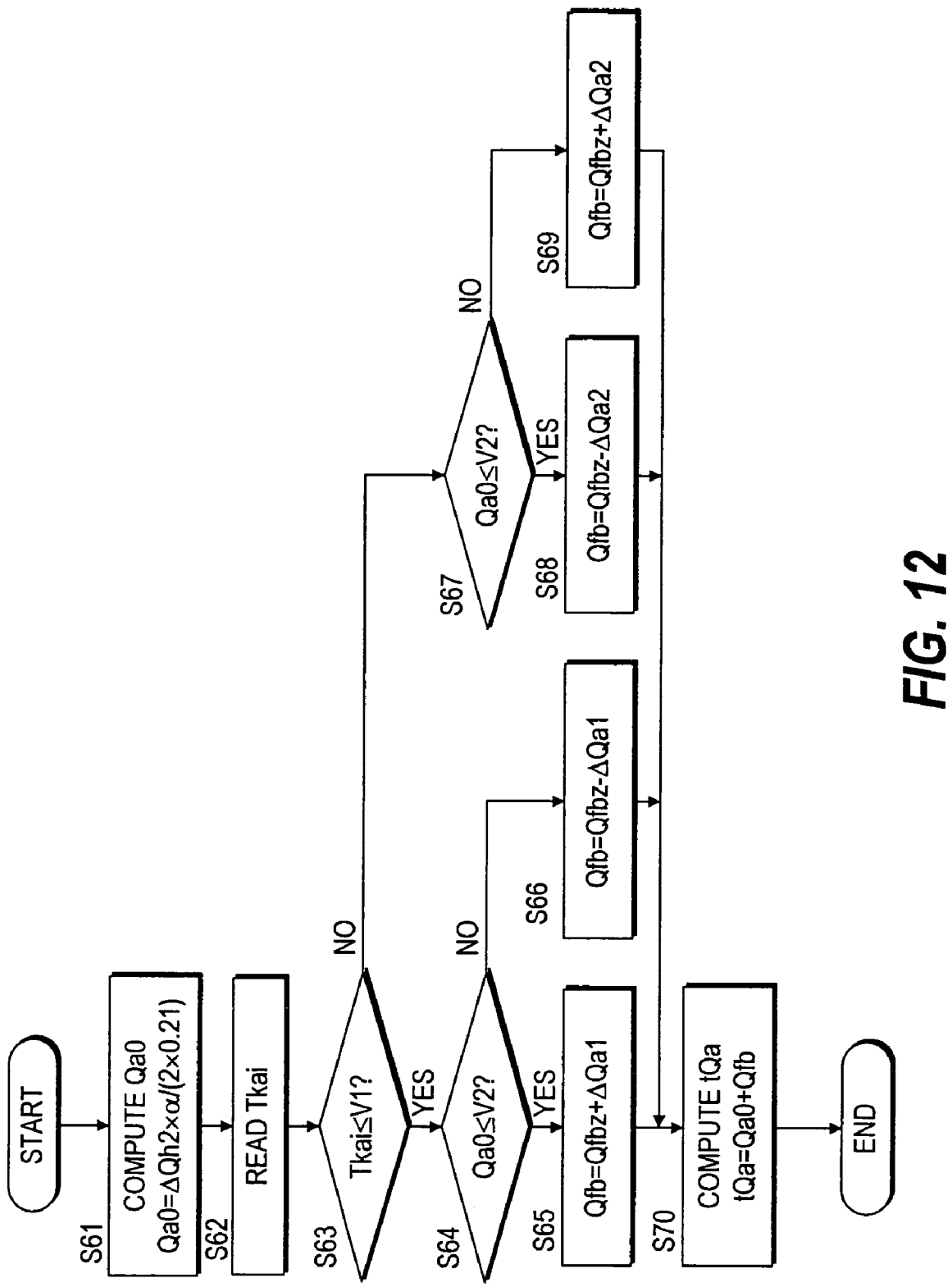
FIG. 12 is a flowchart showing the computation of a target air flowrate.

In FIG. 12, in a step S61, the air flowrate required to burn the amount in the excess hydrogen flowrate ΔQh2 which is distributed to the reformer temperature maintenance device 24, is calculated as an air flowrate basic value Qa0 by the following equation (8):

$$Qa0 = \Delta Qh2 \times \alpha / (2 \times 0.21) \tag{8}$$

This is deduced as follows. If the amount in the excess hydrogen flowrate ΔQh2 which is distributed to the reformer temperature maintenance device 24, is a recycled hydrogen flowrate Qh2kw, then:

$$Qh2kw = \Delta Qh2 \times \alpha \tag{9}$$

so from the chemical reaction, the oxygen flowrate Qo2kw required to burn this recycled hydrogen flowrate Qh2kw is:

$$Qo2kw = Qh2kw/2 \tag{10}$$

The air flowrate (=Qa0) containing this oxygen flowrate Qo2kw is:

$$Qa0 = Qo2kw/0.21 \tag{11}$$

Combining equations (9)-(11), equation (8) is obtained.

In a step S62, the reformate temperature Tkai detected by the temperature sensor 14 is read. In a step S63, the reformer temperature is compared with a first predetermined value V1. When the reformer 8 is warmed up by gas produced by burning excess hydrogen, if the temperature of the reformer 8 increases due to introduction of the burnt gas, the reforming catalyst is activated and a large amount of hydrogen is produced although excess hydrogen is being burnt. Conversely, if the temperature the reformer 8 is low, the reforming catalyst is inactive and hydrogen is not produced. Therefore, the limiting temperature at which the reforming catalyst remains active is set as the first predetermined value V1. Specifically, the first predetermined value V1 is set to the target value tTkai (e.g., 400° C.) or a temperature lower than the target value (approx. 350° C.).

If the reformer temperature Tkai is lower than the first predetermined value V1 (=activation lower limiting temperature), the routine proceeds to a step S64 to raise the reformer 8 to a temperature at which the active state can be maintained, and the air flowrate basic value Qa0 is compared with a second predetermined value V2.

The second predetermined value V2 is used to determine whether or not the running region of the reformer temperature maintenance device 24 lies within a first region or a second region. The first region is a region wherein the catalyst combustion temperature in the reformer temperature maintenance device 24 decreases when the air flowrate (oxygen flowrate) is decreased, and the catalyst combustion temperature in the reformer temperature maintenance device 24 increases when the air flowrate (oxygen flowrate) is increased. The second region is a region wherein the catalyst combustion temperature in the reformer temperature maintenance device 24 increases when the air flowrate (oxygen flowrate) is decreased, and the catalyst combustion temperature in the reformer temperature maintenance device 24 decreases when the air flowrate (oxygen flowrate) is increased. The first region characteristics are obtained when the air flowrate is small, and the second flowrate characteristics are obtained when a certain air flowrate has been exceeded.

Therefore, when the air flowrate basic value Qa0 is less than the second predetermined value V2 (first region), the catalyst combustion temperature in the reformer temperature maintenance device 24 increases by increasing the air flowrate, the routine proceeds to a step S65, and an air flowrate feedback amount Qfb is increased by a predetermined value ΔQa1. Specifically, the air flowrate feedback value Qfb is computed by the following equation (12):

$$Qfb = Qfbz + \Delta Qa1 \tag{12}$$

where, Qfbz=immediately preceding value of Qfb.

In a step S70, the target air flowrate tQa is computed by the following equation (13):

$$tQa = Qa0 + Qfb \tag{13}$$

When the running region lies within the first region and the temperature of the reformer 8 is less than the first predetermined value V1, the air flowrate is continually increased by equations (12), (13) at a control interval so that the temperature of the reformer 8 approaches the first predetermined value V1, and the temperature of the burnt gas supplied from the reformer temperature maintenance device 24 to the reformer 8 therefore rises. In this way, the reformer 8 which has not yet reached the activation lower limiting temperature, can quickly be returned to a temperature exceeding the activation lower limiting temperature.

Although not shown, if the temperature of the reformer 8 falls even though the air flowrate is continually increased by equation (12) at each control interval, increase of the air flowrate is stopped.

Conversely, if the temperature of the reformer 8 is less than the predetermined value V1 and the air flowrate basic value Qa0 exceeds the second predetermined value V2 (second region), the routine proceeds from the steps S63, S64 to a step S66, and the air flowrate feedback amount Qfb is decreased by the predetermined value ΔQa1. Specifically, after the air flowrate feedback amount Qfb is computed by the following equation (14):

$$Qfb = Qfbz - \Delta Qa1 \tag{14}$$

where, Qfbz=immediately preceding value of Qfb, the processing of the step S70 is performed.

When the temperature of the reformer 8 exceeds the predetermined value V1, the routine proceeds from the step S63 to a step S67, and the air flowrate basic value Qa0 is compared with the second predetermined value. If Qa0 is less than the second predetermined value V2 (first region), the routine proceeds to a step S68 and the air flowrate feedback amount Qfb is decreased by a predetermined value ΔQa2. Specifically, the air flowrate feedback amount Qfb is computed by the following equation (15):

$$Qfb = Qfbz - \Delta Qa2 \tag{15}$$

where, Qfbz=immediately preceding value of Qfb, and the processing of the step S70 is performed.

When the running region of the reformer temperature maintenance device 24 is the first region, and the temperature of the reformer 8 exceeds the first predetermined value V1, if the air flowrate is continually decreased by equations (15), (13) at a control interval so that the temperature of the reformer 8 approaches the first predetermined value V1, combustion in the reformer temperature maintenance device 24 is incomplete, and a large amount of unburnt reformate gas will be contained in the burnt gas. When the burnt gas passes through the reformer 8 and again into the reformer temperature maintenance device 24 via the branch passage 23, combustion in the reformer temperature maintenance device 24 is continued by the unburnt gas. In this way, the warming time of the reformer temperature maintenance device 24 can be extended.

Conversely, when the temperature of the reformer 8 exceeds the first predetermined value V1 and the air flowrate basic value Qa0 exceeds the second predetermined value V2 (second region), the routine proceeds from the steps S63, S67 to a step S69, and the air flowrate feedback amount Qfb is increased by a fixed value ΔQa2. Specifically, the air flowrate feedback amount Qfb is computed by the following equation (16):

$$Qfb = Qfbz + \Delta Qa2 \tag{16}$$

where, Qfbz=immediately preceding value of Qfb, and the procedure of the step S70 is performed.

When the computation of the target air flowrate tQa is complete, the routine returns to FIG. 2, and in a step S7, the three temperatures (reformer temperature Tkai, burner temperature Tnen and vaporizer temperature Tjou) detected by the temperature sensors 14, 31, 32 are compared with respective predetermined values Vkai, Vnen, Vjou.

These respective predetermined values Vkai, Vnen, Vjou are as follows. The predetermined value Vkai for the reformer 8 is the minimum temperature (activation lower limiting temperature) at which the activation of the reformer 8 can be maintained, e.g., 400° C. The predetermined value Vnen for the burner 10 is the minimum temperature at which the function required of the burner 10 can be maintained, e.g., 370° C. The predetermined value Vjou for the vaporizer 6 is the minimum temperature at which the function required of the vaporizer 6 can be maintained, e.g., 110° C.

If the three temperatures Tkai, Tnen, Tjou are higher than the respective predetermined values Vkai, Vnen, Vjou, the routine proceeds to steps S9, S10, the reformer temperature maintenance device 24 is operated, and supply of raw material vapor and air to the reformer 8 is stopped.

The reason why the three temperatures Tkai, Tnen, Tjou being higher than the respective predetermined values Vkai, Vnen, Vjou is taken as a condition, is because if the reformer temperature maintenance device 24 is operated and supply of raw material vapor and air to the reformer 8 is stopped although the reformer catalyst is not at activation temperature or the functions required of the burner 10 or vaporizer 6 have not been maintained, if there is a change-over from load decrease to load increase, return to the state immediately prior to load decrease (state prior to generation of excess hydrogen) is delayed. Therefore, the routine only proceeds to the step S8 when the three temperatures Tkai, Tnen, Tjou are all higher than the respective predetermined values Vkai, Vnen, Vjou, and a test is made as to whether or not the state where the three temperatures are higher than the respective predetermined values has continued for a predetermined time or longer.

If the state where the three temperatures are higher than the respective predetermined values has not continued for a predetermined time or longer, this processing is terminated, and only when the state where the three temperatures are higher than the respective predetermined values has continued for a predetermined time or longer, the routine proceeds to the steps S9, S10.

The reason why the continuance of the state where the three temperatures are higher than the respective predetermined values for a predetermined time or longer, is taken as a condition, is as follows. Specifically, it may occur that although one of the three temperatures is not higher than the predetermined value, all of the three temperatures are temporarily higher than the respective predetermined values due to the effect of noise, etc. This means that an incorrect determination is made due to the effect of noise. If a time longer than the time for which noise can affect the temperature signal is set as the predetermined time, even if noise does affect the temperature signal and the three temperatures are all higher than the predetermined values, this state does not continue longer than the predetermined time, and the routine is terminated without further steps. Hence, the reason why continuance of the state where the three temperatures are all higher than the respective predetermined values for a predetermined time or longer, is taken as a condition, is to prevent incorrect determination due to the effect of noise in the temperature signal.

When the state where the three temperatures are higher than the respective predetermined values has continued for a predetermined time or longer, in order to burn reformate gas containing excess hydrogen, in the step S9, the opening of the flowrate control valve 27 is controlled to realize the target recycled reformate gas flowrate Qrec, and the flowrate control valve 28 is controlled to realize the target air flowrate tQa.

Instead of the flowrate control valves 27, 28, control valves which adjust gas flowrate to the target flowrate automatically may also be used. These control valves contain flowrate sensors, and when the computed recycled reformate gas flowrate Qrec or target air flowrate tQa is input, the valve is driven so that the actual flowrate detected by an internal flowrate sensor coincides with the input value.

Further, excess hydrogen is burnt in the reformer temperature maintenance device 24 and the reformer 8 is kept warm by the burnt gas, so there is no need to supply raw material vapor and air to the reformer 8. Hence, in the step S10, a command to stop raw material supply to the vaporizer 6, and a command to stop air supply to the reformer 8, are issued to the temperature controller 13.

In the water feeder 4 and methanol feeder 5 which received these commands, the injectors are closed. In the temperature controller 13 which received these commands, the flowrate control valve 12 is closed.

In a step S7, it is determined whether or not warming by the reformer temperature maintenance device 24 is to be continued. When excess hydrogen is produced, if the supply of raw material vapor and air to the reformer 8 is stopped and warming by the reformer temperature maintenance device 24 is continued, hydrogen burnt by the reformer temperature maintenance device 24 is completely consumed, and inert gas (gas after combustion) is recycled between the reformer 8 and the reformer temperature maintenance device 24. In this case, the warming due to the reformer temperature maintenance device 24 has no effect and the reformer temperature falls. The temperatures of the burner 10 and vaporizer 6 also fall due to loss of heat.

Hence, when one of the three temperatures is lower than the predetermined temperature during warming by the reformer temperature maintenance device 24, the routine proceeds from the step S7 to FIG. 3, and depending on the temperatures of the reformer 8, burner 10 and vaporizer 6, warming by the reformer temperature maintenance device 24 when the supply of raw material vapor and air has stopped, is discontinued.

Specifically, this discontinuation occurs in the following two cases.

(1) When the three temperatures have all fallen below the respective predetermined values during warming by the reformer temperature maintenance device 24, the routine proceeds from the step S11 to the steps S12, S13 of FIG. 3, and the following procedure is performed.

(a) recycling to the reformer temperature maintenance device 24 is stopped (flowrate control valve 27 is closed).

(b) raw material supply to the vaporizer 6 is started (injectors in the water feeder 4 and methanol feeder 5 are opened).

(c) air supply to the reformer 8 is started (flowrate control valve 12 is opened).

(d) fuel supply to the burner 10 is started (injector of the second methanol feeder 35 is opened).

The reason why the above operation (d) is added, is because when the three temperatures have all fallen below their respective predetermined values, the upstream side of the burner 10 does not immediately warm up, and to warm up the entire fuel reformate system, it is effective to supply raw fuel to and burn raw fuel in the burner 10 separately.

Thus, the temperature of the burner 10 first rises due to combustion of the supplied raw fuel (methanol). The temperature of the vaporizer 6 rises due to the burnt gas from the burner 10. When the temperature of the vaporizer 6 rises, raw material which is vaporized by the vaporizer 6 is transported to the reformer 8, and the temperature of the reformer 8 rises due to the partial oxidation reaction of the raw material vapor. When the reforming catalyst reaches activation temperature, the reformer 8 produces hydrogen-rich reformate gas, and the hydrogen in the reformate gas which was not used by the fuel cell 9 is burnt by the burner 10. Hence, the temperature of the reformer 8 is returned to the activation temperature, the temperatures of the burner 10 and vaporizer 6 are returned to the temperatures at which their functions can be maintained, and hydrogen-rich reformate gas is produced.

(2) When one of the three temperatures has fallen below the predetermined values during warmup by the reformer temperature maintenance device 24, the routine proceeds from the steps S11, S14 to a step S15, and the operations from the aforesaid (a) to (c) are performed.

Due to these operations, the temperature of the reformer 8 rises due to the reaction heat of the partial oxidation reaction, the temperature of the burner 10 rises due to combustion of hydrogen in the hydrogen-rich reformate gas produced by the reformer 8 which was not used by the fuel cell, and the temperature of the vaporizer 6 rises due to the effect of the temperature rise of the burner 10.

In the aforesaid (2), the operation (d) is absent. This is because, when one of the three temperatures is lower than the predetermined value, the reformer 8, burner 10 and vaporizer 6 can be immediately warmed up, so there is no need to supply fuel separately to the burner 10.

However, in the aforesaid (1) and (2), if a large amount of raw material is suddenly supplied, the temperature of the vaporizer 6 may drop, so raw material is supplied while suppressing the raw material increase speed to a predetermined value (fixed value).

Hence, whether to perform or discontinue warmup by the reformer temperature maintenance device 24 is repeatedly determined at a control interval according to the temperatures of the reformer 8, burner 10 and vaporizer 6, so the reforming catalyst can continually be maintained at the activation temperature, and when it is necessary to produce hydrogen-rich reformate gas again in the reformer 8, the hydrogen-rich reformate gas can be produced with a good response.

Next, the effect of this embodiment will now be described.

In this embodiment, the reformer temperature maintenance system comprises a recycling device which recycles part or all of the reformate gas containing excess hydrogen upstream of the reformer 8 when it is determined that excess hydrogen is present, and the reformer temperature maintenance device 24 which warms up the reformer 8 using gas produced by burning reformate gas recycled by the recycling device. Hence, when there is a load decrease which might produce excess hydrogen, the excess hydrogen is burnt to warm up the reformer 8. Thus, the temperature of the reformer catalyst can be maintained at a sufficient temperature to catalyze the reforming reaction in the reformer 8. After a load decrease which produces excess hydrogen, if there is a load increase which requires hydrogen production, the reforming reaction in the reformer 8 can be quickly started, and hydrogen production response performance is enhanced.

When the reformer 8 is warmed up by the reformer temperature maintenance device 24 using gas obtained by burning reformate gas, the supply of the raw material vapor and air (gas containing oxygen) to the reformer 8 is stopped, so the consumption of excessive raw material while excess hydrogen is being produced is prevented, and fuel consumption is suppressed (steps S4, S10 of FIG. 2).

When excess hydrogen is produced, unnecessary raw material consumption is prevented by stopping raw material supply to the vaporizer 6. However, when raw material and air are no longer supplied to the reformer 8, the catalyst reaction does not occur, and the temperature of the reformer 8 would normally fall. If the temperature of the reformer 8 falls, if hydrogen is then required and it is necessary to produce reformate gas in the reformer 8, some time is required for the catalyst in the reformer to become active, and response performance is impaired. Consequently, the reformer 8 must constantly maintain catalyst activation temperature. In this embodiment, the production of excess hydrogen by the reformer 8 continues for some time even after supply of air to the reformer 8 and raw material to the vaporizer 6 has been cut due to the raw material and air supply delay, so the reformer temperature maintenance device 24 is used to burn the excess hydrogen in the reformate gas and keep the reformer 8 warm.

When it is determined that excess hydrogen has been produced, the target recycled reformate gas amount Qrec is computed based on the temperatures of the reformer 8 and burner 10, and the reformate gas amount ΔQgas containing excess hydrogen (FIG. 11). The opening of the flowrate control valve 27 is then controlled so that the target recycled reformate gas flowrate Qrec is realized. The recycled reformate gas flowrate can be adjusted according to the temperatures of the reformer 8 and burner 10, so the temperatures of the reformer 8 and burner 10 are prevented from exceeding the respective permitted upper limiting temperatures while maintaining the reforming catalyst in an active state.

Reformate gas containing excess hydrogen is distributed between the reformer 8 and burner 10 based on the temperatures of the reformer 8 and burner 10 (FIG. 11). The distribution flowrate of reformate gas containing excess hydrogen to the reformer 8 and burner 10 can be varied according to the temperatures of the reformer 8 and burner 10, so the temperatures of the reformer 8 and burner 10 are prevented from exceeding the respective permitted upper limiting temperatures.

The distribution ratio is increased to whichever of the reformer 8 and burner 10 is lower than the respective permitted upper limiting temperature (FIG. 11), so excess hydrogen is burnt within a range such that the temperatures of the reformer 8 and burner 10 do not exceed the permitted upper limiting temperatures.

If the temperatures of both the reformer 8 and burner 10 are lower than the permitted upper limiting temperatures, and a large amount of reformate gas is supplied to one of them, there is a possibility that the temperature of the device to which a large amount was supplied will exceed the permitted upper limiting temperature. However, if the temperatures of both the reformate and burner 10 are lower than the permitted upper limiting temperatures, the distribution ratio is equalized (steps S42, S43, S45 of FIG. 11), so the distribution of a large amount of reformate gas to only one device is avoided.

When air is supplied to burn the reformate gas recycled by the flowrate control valve 27 to the reformer temperature maintenance device 24, the flowrate of this air supply to the reformer temperature maintenance device 24 is controlled based on the reformer temperature (FIG. 12), so the air flowrate can be adjusted to maintain the temperature of the reforming catalyst at activation temperature. For example, by decreasing the air flowrate the higher the reformer temperature is, unburnt reformate gas is continually recycled between the reformer 8 and reformer temperature maintenance device 24, so the warmup time due to the reformer temperature maintenance device 24 can be extended, the time for which supply of raw material and air to the reformer 8 is stopped can be extended, and fuel consumption can be further suppressed. When the reformer temperature is low, by increasing the air flowrate, the warmup effect due to the reformer temperature maintenance device 24 is increased, and the temperature of the reforming catalyst can be maintained at the activation temperature.

When the reformer temperature is higher than the first predetermined value (activation lower limiting temperature of reforming catalyst), the air flowrate supplied to the reformer temperature maintenance device 24 is decreased (steps S63, S67, S68 of FIG. 12), so unburnt reformate gas is continually recycled between the reformer 8 and reformer temperature maintenance device 24, and the warmup time due to the reformer temperature maintenance device 24 can be extended.

When the reformer temperature is lower than the first predetermined value (activation lower limiting temperature of reforming catalyst), the air flowrate supplied to the reformer temperature maintenance device 24 is increased (steps S63, S64, S65 of FIG. 12), so hot burnt gas can be recycled to the reformer 8, and the temperature of the reformer 8 can be raised to the activation temperature.

When the reformer 8 is warmed by the reformer temperature maintenance device 24 and supply of raw material and air to the reformer 8 is stopped, if the temperature of one of the reformer 8, burner 10 and vaporizer 6 falls below the respective predetermined value, warming of the reformer 8 by the reformer temperature maintenance device 24 is stopped, and supply of raw material and air to the reformer 8 is restarted (step S7 in FIG. 2, steps S11, S14, S15 in FIG. 3), so a partial oxidation reaction occurs in the reformer 8, the reformer temperature rises, and the reformer temperature can be returned to a temperature exceeding the predetermined value. Further, reformate gas is produced due to the reforming reaction in the reformer 8, this reformate gas is burnt in the burner 10, and the heat produced is supplied to the vaporizer 6, so the temperatures of the burner 10 and vaporizer 6 can also be returned to temperatures exceeding the predetermined values.

While the reformer 8 is warmed by the reformer temperature maintenance device 24 and supply of raw material vapor and air to the reformer 8 is stopped, insufficiency of combustible reformate gas in the reformer temperature maintenance device 24 which would lead to a decrease of reformer temperature, or insufficiency of combustible gas burnt by the burner 10 which would lead to a decrease of burner temperature, and consequent decrease of vaporizer temperature, are prevented.

After all the three temperatures of the reformer 8, burner 10 and vaporizer 6 have returned above the respective predetermined values, when the state where the three temperatures have all returned above the respective predetermined values has continued for a predetermined time, the warming of the reformer 8 by the reformer temperature maintenance device 24 and interruption of the supply of raw material vapor and air are performed again (step S4, steps S7-S10 in FIG. 2). In this way, after the predetermined time has elapsed, the temperature of the reformer catalyst can be again maintained at a sufficient temperature to catalyze the reforming reaction, and when the load increases after a load decrease which produces excess hydrogen, the reforming reaction in the reformer 8 can be rapidly restarted.

The difference between the hydrogen flowrate Qh2gen in the reformate gas produced by the reformer 8, and the hydrogen flowrate Qh2sum required by the fuel cell 9 to produce the power required by the inverter 18 and drive motor 19 (load devices), is set as the excess hydrogen flowrate ΔQh2 (FIG. 10), so the excess hydrogen flowrate ΔQh2 is obtained according to the fluctuation of the power consumed by the load devices.

Carbon monoxide in the reformate gas increases and the proportion of hydrogen component in the reformate gas decreases, the higher the reformer temperature is above the standard temperature. However, the hydrogen flowrate in the reformate gas produced by the reformer 8 when the reformer 8 is at the standard temperature, is corrected based on the reformer temperature, and the corrected value is taken as the hydrogen flowrate in the reformate gas produced by the reformer 8 (steps S26, S27 in FIG. 4), so the hydrogen component amount can be estimated with high precision even when the reformer temperature is higher than the standard temperature.

Carbon monoxide in the reformate gas increases and the proportion of hydrogen component in the reformate gas decreases the larger the mass ratio is above the standard mass ratio (the larger the amount of oxygen is). However, the hydrogen flowrate in the reformate gas produced by the reformer 8 when the mass ratio of raw material and oxygen supplied to the reformer 8 is the standard mass ratio, is corrected based on the actual mass ratio of raw material and oxygen supplied to the reformer 8, and the corrected value is taken as the hydrogen flowrate in the reformate gas produced by the reformer 8 (steps S25, S27 in FIG. 4), so the hydrogen component can be estimated with high precision even when the mass ratio is higher than the standard mass ratio.

Figure 13:
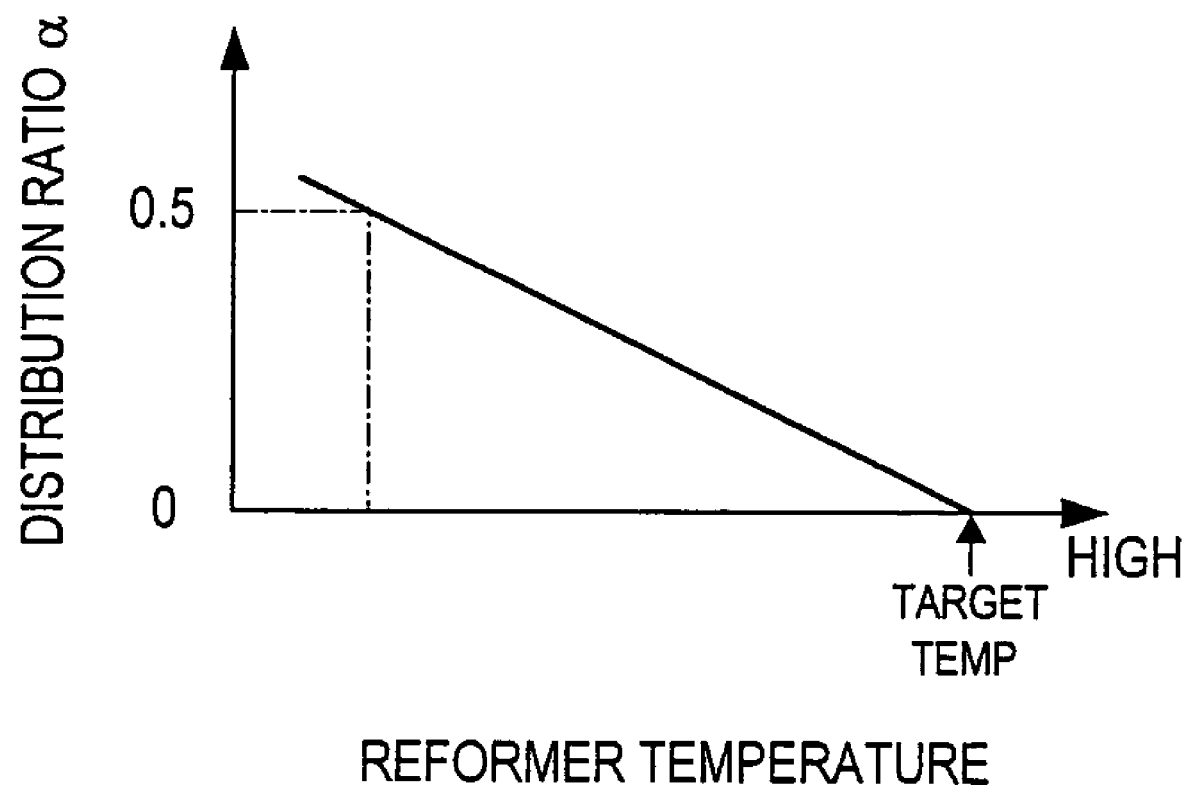
FIG. 13 is a characteristic diagram of a distribution ratio according to a second embodiment.

FIG. 13 is a characteristic diagram of the distribution ratio α of reformate gas containing excess hydrogen to the reformer 8 according to a second embodiment. In the first embodiment, the distribution ratio α of reformate gas containing excess hydrogen to the reformer 8 was a discrete value, but in the second embodiment, it is a continuous value according to the reformer temperature.

Specifically, as shown in FIG. 13, the distribution ratio α is set to be larger, the lower the reformer temperature is below the target temperature. The reason for this is as follows. When the target temperature has not been reached, combustion of excess hydrogen and temperature rise are permitted. When the target temperature is reached, combustion of excess hydrogen and rise of temperature cannot be permitted. Therefore, α is set larger, the lower the reformer temperature is.

In addition to this embodiment, the following distribution method may be envisaged. When a large amount of reformate gas is supplied to whichever of the reformer 8 and burner 10 has the larger temperature variation per unit reformate gas variation amount, it may occur that the temperature of the device having the larger temperature variation per unit reformate gas variation amount, exceeds the permitted upper limiting temperature. Hence, the distribution ratio is increased to whichever of the reformer 8 and burner 10 has the smaller temperature variation per unit reformate gas variation amount.

According to this method, the possibility that the temperature of the device having the larger temperature variation per unit reformate gas variation amount exceeds the permitted upper limiting temperature, is avoided.

The entire contents of Japanese Patent Application P2002-72059 (filed Mar. 15, 2002) are incorporated herein by reference.

Although the invention has been described above by reference to a certain embodiment of the invention, the invention is not limited to the embodiment described above. Modifications and variations of the embodiments described above will occur to those skilled in the art, in the light of the above teachings. The scope of the invention is defined with reference to the following claims.

FIELD OF APPLICATION

This invention may be applied to a fuel cell system, such as for example a vehicle fuel cell system, which controls a flowrate of a gas containing a raw material and a gas containing oxygen supplied to a reformer, so that the fuel cell generates power required by a load which varies according to running conditions. It is effective for efficiently using excess hydrogen produced when load decrease occurs, and thereby enhancing fuel cost-performance of the system.

The invention claimed is:

1. A method of controlling a fuel cell system having a reformer which produces reformate gas containing hydrogen using gas containing oxygen and raw material vapor, and a fuel cell which generates power by reacting hydrogen in the reformate gas with oxygen, comprising:
   determining whether excess hydrogen is produced by the reformer, and
   when it is determined that excess hydrogen is produced, recycling part or all of a reformate gas containing excess hydrogen downstream of the reformer and upstream of the fuel cell, burning at least some of the excess hydrogen to keep the reformer warm, and stopping the supply of raw material vapor and gas containing oxygen to the reformer.

2. A method of controlling a fuel cell system having a reformer which produces reformate gas containing hydrogen using gas containing oxygen and raw material vapor, and a fuel cell which generates power by reacting hydrogen in the reformate gas with oxygen, comprising:
   providing a reformer temperature maintenance system which keeps the reformer warm, and a controller, wherein the reformer temperature maintenance system comprises:
      a recycling device which recycles part or all of a reformate gas containing excess hydrogen downstream of the reformer and upstream of the fuel cell, and
      a reformer temperature maintenance device which keeps the reformer warm using gas produced by burning the excess hydrogen in the reformate gas recycled by the recycling device; and
   the controller determining whether excess hydrogen is produced by the reformer; and when it is determined that excess hydrogen is produced, burning at least some of the excess hydrogen in the reformer temperature maintenance system to keep the reformer warm and the controller stopping the supply of raw material vapor and gas containing oxygen to the reformer.

3. The method according to claim 2, wherein the fuel cell system further comprises:
   a burner which burns hydrogen in the reformate gas which was not used by the fuel cell, and
   a vaporizer which vaporizes raw material by the heat of the burner.

4. The method according to claim 3, further comprising:
   the controller computing a target flowrate of reformate gas recycled by the recycling device based on a flowrate of reformate gas containing excess hydrogen, temperature of the reformer and temperature of the burner, when it is determined that excess hydrogen is produced; and
   the controller controlling the recycling device so that the reformate gas recycled by the recycling device is the target flowrate.

5. The method according to claim 4, further comprising:
   the controller computing the target flowrate of recycled reformate gas based on a flowrate of excess hydrogen produced.

6. The method according to claim 4, further comprising:
   the controller setting a ratio which distributes the reformate gas containing excess hydrogen between the reformer and burner based on the temperature of the reformer and burner, and
   the controller computing the target flowrate of recycled reformate gas based on the distribution ratio and the flowrate of reformate gas containing excess hydrogen.

7. The method according to claim 6, further comprising:
   the controller biasing the distribution ratio in favor of whichever of the reformer and burner has a temperature lower than its respective permitted upper limiting temperature.

8. The method according to claim 6, further comprising:
   the controller equalizing the distribution ratio when both the reformer and burner have a temperature lower than their respective permitted upper limiting temperatures.

9. The method according to claim 6, further comprising:
   the controller biasing the distribution ratio in favor of whichever of the reformer and burner has the smaller temperature variation per unit reformate gas variation amount.

10. The method according to claim 2, further comprising:
    the controller supplying air for burning the excess hydrogen in the reformate gas recycled by the recycling device to the reformer temperature maintenance device, and controlling the flowrate of air supplied to the reformer temperature maintenance device based on the temperature of the reformer.

11. The method according to claim 10, further comprising:
    the controller decreasing the flowrate of air supplied to the reformer temperature maintenance device when the temperature of the reformer is higher than a first predetermined value and the air flowrate to the reformer temperature maintenance device is lower than a second predetermined value.

12. The method according to claim 10, further comprising:
    the controller increasing the flowrate of air supplied to the reformer temperature maintenance device when the temperature of the reformer is lower than the first predetermined value and the air flowrate to the reformer temperature maintenance device is lower than the second predetermined value.

13. The method according to claim 10, further comprising:
    the controller increasing the flowrate of air supplied to the reformer temperature maintenance device when the temperature of the reformer is higher than the first predetermined value and the air flowrate to the reformer temperature maintenance device exceeds the second predetermined value.

14. The method according to claim 10, further comprising:
    the controller decreasing the flowrate of air supplied to the reformer temperature maintenance device when the temperature of the reformer is lower than the first predetermined value and the air flowrate to the reformer temperature maintenance device exceeds the second predetermined value.

15. The method according to claim 3, further comprising:
    the controller stopping the warming by the reformer temperature maintenance device, and restarting supply of the raw material vapor and gas containing oxygen to the reformer, when the reformer is kept warm by the reformer temperature maintenance device, and the supply of raw material vapor and gas containing oxygen to the reformer is stopped, when any one of the temperature of the reformer, the temperature of the burner and the temperature of the vaporizer is less than a predetermined value.

16. The method according to claim 15, further comprising:
    the controller restarting warming of the reformer by the reformer temperature maintenance device, and stopping supply of raw material vapor and gas containing oxygen to the reformer, after the temperature of the reformer, the temperature of the burner and the temperature of the vaporizer have all returned above their respective predetermined values, and the state where all of the temperature of the reformer, the temperature of the burner and the temperature of the vaporizer are above their respective predetermined values has continued for a predetermined time.

17. The method according to claim 5, further comprising:
the controller computing the excess hydrogen flowrate by subtracting the hydrogen flowrate required by the fuel cell to provide the power consumed by load devices, from the hydrogen flowrate in the reformate gas produced by the reformer.

18. The method according to claim 17, further comprising:
the controller computing the hydrogen flowrate in the reformate gas produced by the reformer by correcting the hydrogen flowrate in the reformate gas produced by the reformer when the reformer is at a standard temperature, based on the temperature of the reformer.

19. The method according to claim 17, further comprising:
the controller computing the hydrogen flowrate in the reformate gas produced by the reformer by correcting the hydrogen flowrate in the reformate gas produced by the reformer when the mass ratio of raw material and oxygen supplied to the reformer is a standard mass ratio, based on the actual mass ratio of raw material and oxygen supplied to the reformer.

20. The method according to claim 5, further comprising:
the controller determining that excess hydrogen is present when the excess hydrogen flowrate is higher than a predetermined value.

\* \* \* \* \*